(12) United States Patent
Huck et al.

(10) Patent No.: US 7,554,923 B2
(45) Date of Patent: Jun. 30, 2009

(54) TANDEM CONNECTION ACTIVATION/DEACTIVATION

(75) Inventors: Martin Huck, Möglingen (DE); Jörg Jäkel, Stuttgart (DE)

(73) Assignee: ALCATEL, Paris (FR)

( * ) Notice: Subject to any disclaimer, the term of this patent is extended or adjusted under 35 U.S.C. 154(b) by 1143 days.

(21) Appl. No.: 10/437,054

(22) Filed: May 14, 2003

(65) Prior Publication Data

US 2003/0231638 A1 Dec. 18, 2003

(30) Foreign Application Priority Data

Jun. 12, 2002 (EP) .................................. 02360171

(51) Int. Cl.
*G01R 31/08* (2006.01)
(52) U.S. Cl. ....................... 370/242; 370/248
(58) Field of Classification Search ................ 370/248, 370/222, 216, 466, 477, 242; 709/224; 714/776, 714/755
See application file for complete search history.

(56) References Cited

U.S. PATENT DOCUMENTS

| | | | | |
|---|---|---|---|---|
| 5,555,248 A * | 9/1996 | Sugawara | ..................... | 714/704 |
| 5,920,545 A * | 7/1999 | Rasanen et al. | ............ | 370/232 |
| 5,959,998 A * | 9/1999 | Takahashi et al. | ........... | 370/431 |
| 6,381,249 B1 * | 4/2002 | Chan et al. | .................. | 370/465 |
| 6,498,796 B2 * | 12/2002 | Wang et al. | ................ | 370/466 |
| 6,577,594 B1 * | 6/2003 | Abbas et al. | ............... | 370/222 |
| 6,594,228 B1 * | 7/2003 | Naidoo et al. | ............... | 370/217 |
| 6,735,736 B2 * | 5/2004 | Korall et al. | ................ | 714/776 |
| 6,757,243 B1 * | 6/2004 | Chaudhuri et al. | .......... | 370/221 |
| 6,785,339 B1 * | 8/2004 | Tahernezhaadi et al. | ..... | 375/241 |
| 6,798,748 B1 * | 9/2004 | Hessler et al. | .............. | 370/242 |
| 6,807,152 B1 * | 10/2004 | Hessler et al. | .............. | 370/242 |
| 6,859,453 B1 * | 2/2005 | Pick et al. | ................... | 370/358 |

(Continued)

FOREIGN PATENT DOCUMENTS

DE 198 36 254 A1 2/2000

(Continued)

OTHER PUBLICATIONS

Brungard D, Vissers M: "Draft new recommendation ITU-T G.709, Update of Com 15-16", Contribution to T1 Standards Project, Jan. 8-11, 2001, XP002218059, pp. 1-9, 84-87.

(Continued)

*Primary Examiner*—Phirin Sam
(74) *Attorney, Agent, or Firm*—Sughrue Mion, PLLC

(57) ABSTRACT

A method for the automatic activation and deactivation of a tandem connection (2-6) is provided responsive to receiving an activation or deactivation request. Prior to activation, received transmission signals are monitored (M) for an existing tandem connection to avoid creation of overlapping tandem connections. Further, responsive to receiving a deactivation request, the tandem connection sink function (SK1) is deactivated and the existing tandem connection is monitored (M1) to detect when no tandem connection information is received anymore to automatically deactivate the tandem connection source function (SO1) as well. Direct signaling of a sink inactive identifier (RDI) takes also place between the tandem connection terminating network elements (2, 6) to inform the far end tandem connection terminating network element (6) of an automatic deactivation of the tandem connection sink function (SK1). Upon reception of the sink inactive identifier (RDI), the far end network element (6) deactivates its tandem connection source function (SO2).

11 Claims, 3 Drawing Sheets

U.S. PATENT DOCUMENTS

| | | | |
|---|---|---|---|
| 6,938,187 B2 * | 8/2005 | Brissette | 714/43 |
| 7,042,847 B2 * | 5/2006 | Gourley et al. | 370/242 |
| 7,133,365 B2 * | 11/2006 | Klinker et al. | 370/238 |
| 7,139,479 B2 * | 11/2006 | Ohira et al. | 398/33 |
| 7,143,161 B2 * | 11/2006 | Brissette | 709/224 |
| 7,200,157 B1 * | 4/2007 | Hessler et al. | 370/509 |
| 2002/0067698 A1 * | 6/2002 | Gourley et al. | 370/248 |
| 2002/0141332 A1 * | 10/2002 | Barnard et al. | 370/218 |
| 2003/0097472 A1 * | 5/2003 | Brissette | 709/245 |

FOREIGN PATENT DOCUMENTS

| | | | |
|---|---|---|---|
| DE | WO 00/10276 | * | 2/2000 |
| EP | 1041760 A1 | * | 10/2000 |
| JP | 08331130 A | * | 12/1996 |

OTHER PUBLICATIONS

Brungard D et al, AT&T: "Tandem Connection Monitoring Functions—Option 1 for Inclusion In G. 783" Contribution to T1 Standards Project, XX, XX, Jan. 6, 1007, pp. 1-12, XP000931363.

Brungard D A, AT&T: "Draft ITU-T G.709" Contribution to T1 Standards Project, XX, XX, Jul. 11, 2000, pp. 1-47, XP000955613.

Goodson W E : "Draft Proposed Standard—T1/105.05 ( Sonet)" Committee T1-Telecommunications T1X1.5/2001-078, Mar. 26, 2001, XP002218060, pp. 1-23.

"G.783: Characteristics of SDH Equipment Functional Blocks" ITU-T Series G. Oct. 2000, XP002218061, pp. 1-24, 163-188, 292-293.

"G.798: Characteristics of Optical Transport network hierarchy equipment functional blocks" ITU-T Series G, Jan. 2002, XP002218062, pp. 1-5, 208-217.

"G.709: Interface for the optical transport network (OTN)" ITU-T Series G, Feb. 2001, XP002218063.

"G.707/Y.1322: Network node interface for the synchronous digital hierarchy (SDH)" ITU-T Series G, Oct. 2000, XP002218064, pp. 1-20, 121-143.

* cited by examiner

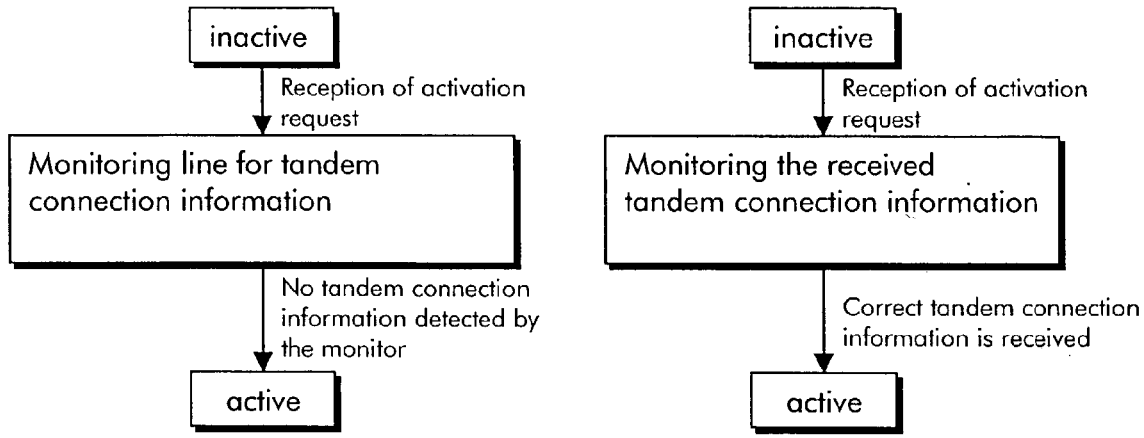
*Fig. 11*     *Fig. 12*
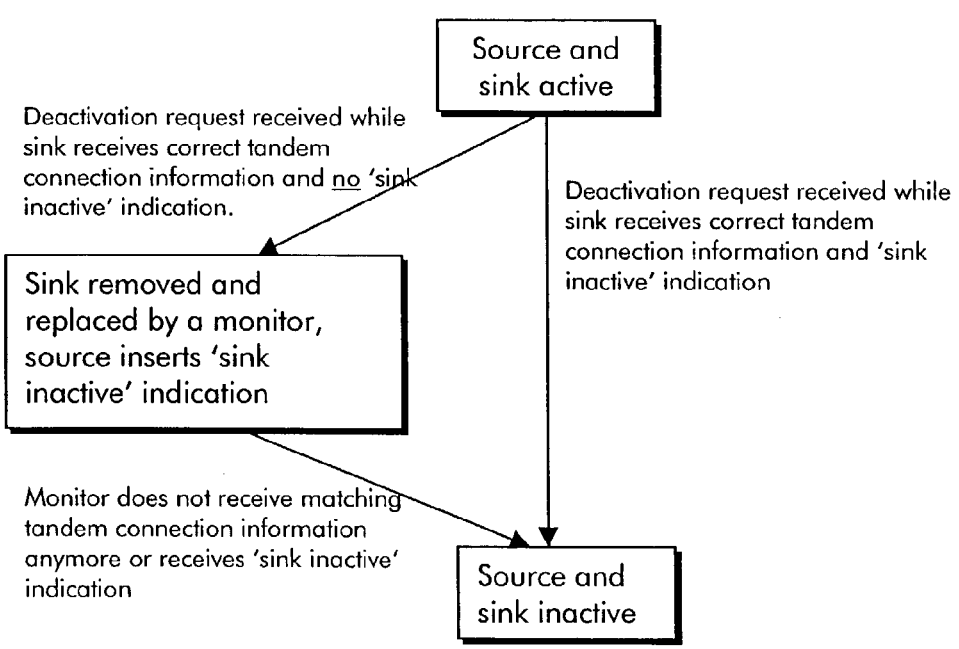
*Fig. 13*

TANDEM CONNECTION ACTIVATION/DEACTIVATION

The invention is based on a priority application EP 02 360 171.9 which is hereby incorporated by reference.

FIELD OF THE INVENTION

The present invention relates to the field of telecommunications and more particularly to a method and network element for activating or deactivating tandem connection monitoring in a transmission network.

BACKGROUND OF THE INVENTION

Modern transmission networks are composed of a number of interconnected network elements like terminal multiplexers, add/drop multiplexers, crossconnects, and regenerators. Examples of transmission networks are synchronous transmission networks known as SDH or SONET (G.707 10/2000) and optical transport networks (OTN, G.709 02/2001). Such networks serve for the transport of tributary user signals in multiplexed form.

The connection between two physically interconnected network elements in a transmission network is termed section. A section can be monitored for alarm and error conditions. The route a particular tributary signal, also referred to as multiplex unit, takes through a transmission network between source and sink network elements is known as path. In other words, a path is a virtual end-to-end end connection of a multiplex unit through a transmission network. A path can also be monitored from end to end for alarm and error conditions. A tandem connection is defined on a segment of a path and exists for the purpose of alarm and error monitoring, as well. For example, a tandem connection can be transported over a linked sequence of sections on a transmission path. Tandem connections and corresponding source and sink functions are defined in ITU-T G.707, G.709, and G.783, which are incorporated by reference herein.

A problem is that a tandem connection sink which does not receive correct tandem connection information interrupts the path. Therefore, a tandem connection source should not be removed as long as the sink is expecting tandem connection information. On the other hand, a sink without corresponding source should not be activated. Furthermore, the creation of overlapping or nested tandem connections has to be avoided because the new sink or source may disturb an already existing tandem connection and the traffic path.

Activation and deactivation of tandem connections requires a sequence of configuration steps in the network elements where the tandem connection is terminated. The configuration steps in both network elements terminating a tandem connection have therefore to be synchronized in order not to interrupt traffic on a working traffic path. According to ITU-T G.798, which is incorporated by reference herein, a synchronization by the network management system is foreseen. This is, however, complicated, slow, and prone to errors. Moreover, network management interaction requires that both terminating network elements of a tandem connection belong to the same management domain. G.709 also defines a one-byte TCM activation/deactivation field (TCM ACT, TCM: tandem connection monitoring) in the frame overhead but no protocol for activation/deactivation is described and the field is not yet used today.

It is therefore an object of the present invention to provide a method and associated network element for the activation and deactivation of tandem connections without network management intervention.

SUMMARY OF THE INVENTION

According to the present invention, automatic activation and deactivation of a tandem connection takes place responsive to receiving an activation or deactivation request. Prior to activation, received transmission signals are monitored for an existing tandem connection to avoid creation of overlapping tandem connections. Further, responsive to receiving a deactivation request, the tandem connection sink function is deactivated and the existing tandem connection is monitored to detect when no tandem connection information is received anymore to automatically deactivate the tandem connection source function as well.

In another aspect of the present invention, direct signaling of a sink inactive identifier is provided between the tandem connection terminating network elements to inform the far end tandem connection terminating network element of an automatic deactivation of the tandem connection sink function. Upon reception of the sink inactive identifier, the far end network element deactivates its tandem connection source function.

The invention has the advantage that it allows activation/deactivation of tandem connections using only local knowledge inside each network element. The invention also simplifies installation and it particularly greatly simplifies tandem connection monitoring in the case when a path segment between different operators is to be monitored.

BRIEF DESCRIPTION OF THE DRAWINGS

Preferred embodiments of the present invention will now be described with reference to the accompanying drawings in which

FIGS. 11 to 13 show state diagrams of the method according to the invention.

DETAILED DESCRIPTION OF THE INVENTION

In order not to interrupt traffic on an existing path, it is necessary to synchronize configuration steps in intermediate network elements to set up or remove a tandem connection on this path. The invention describes a method which allows the automatic activation and deactivation using only local knowledge inside each network element. For deactivation it is necessary to exchange information between the network elements terminating the tandem connection. The present invention therefore provides a direct communication between terminating network elements of a tandem connection.

As no such communication is defined for SDH/SONET in G.707, invention preferably substitutes this missing signaling with a reinterpretation of the 'remote defect indication' (RDI)

that is exchanged on the tandem connection layer. For OTN, the invention proposes the use of an additional 'Fault Indication Code'. Alternatively it would be also possible to use the backward defect indication or the 'TCM ACT' channel.

Before a new tandem connection source is activated, according to the invention, it is examined that there is not any other tandem connection going to be overwritten. The invention achieves this by using a temporary tandem connection monitor. The source will be activated automatically as soon as this monitor detects no tandem connection information.

Before a new tandem connection sink is activated it is necessary to ensure that correct tandem connection information is properly received, e.g., the tandem connection information that is sent by the intended source. The invention achieves this by using a temporary tandem connection monitor. The sink will be automatically activated as soon as this monitor detects correct tandem connection information.

Once a tandem connection is established on a path two steps are necessary in both network elements to deactivate the tandem connection without affecting the path. The steps in both network elements have to be synchronized. First both tandem connection sinks have to be removed and then the sources are deactivated.

The invention provides the information exchange between both ends of the tandem connection to indicate when a tandem connection sink is removed. For SDH paths the invention achieves the information exchange by reinterpretation of the remote defect indication which is exchanged between tandem connection termination points. For OTN, it uses a new 'Fault Indication Code' or the backward defect indication or the 'TCM ACT' channel.

Figure 1:
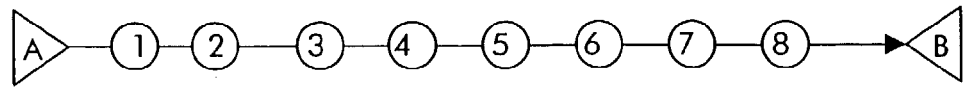
FIG. 1 shows a path through a network.

Starting point is a working path from source A to termination B. The described solution is equally applicable for each direction of a bi-directional path. This is shown schematically in FIG. 1 by way of example. A path terminating network element A is connected over a network path to a receiving path terminating network element B. The path is established over a number of intermediate network elements 1-8.

It is now assumed that a tandem connection shall be set up to monitor a segment of the path between intermediate network elements 2 and 6. According to the present invention, the management system (or the local operators) sends a first request to the network element 2, where the tandem connection source is going to be located, and another request to the network element 6, where the tandem connection sink is going to be located. The requests in both network elements are processed asynchronously.

Figure 2:
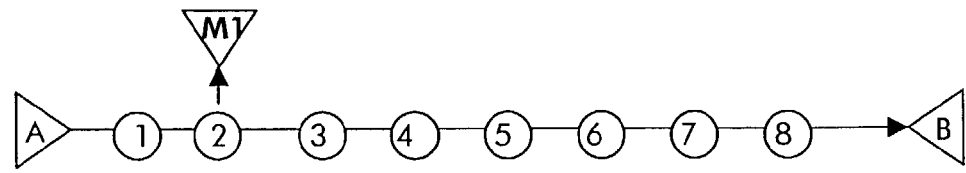
FIG. 2 shows creation of a first temporary tandem connection monitor.
Figure 3:
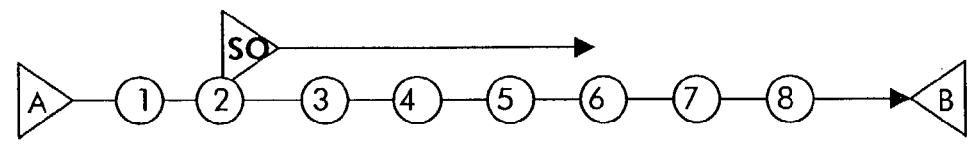
FIG. 3 shows activation of a tandem connection source.

The network element where the tandem connection source is going to be located proceeds as follows: First, a temporary tandem connection monitor M1 is created. This is shown in FIG. 2. When M1 detects that there is no tandem connection information, M1 is removed and a tandem connection source function SO in network element 2 is activated. This is shown in FIG. 3. The source starts sending tandem connection information and automatic source activation is complete.

Figure 4:
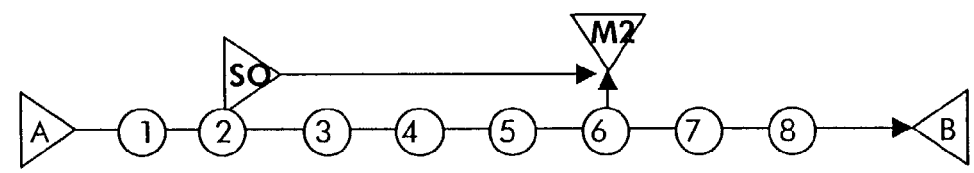
FIG. 4 shows creation of a second temporary tandem connection monitor.
Figure 5:
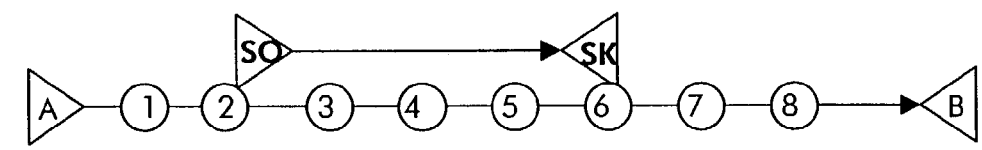
FIG. 5 shows activation of a tandem connection sink.

The network element 6 where the tandem connection sink is going to be located proceeds as follows: First a temporary monitor M2 is created. This is shown in FIG. 4. M2 may detect that there is no tandem connection information available because the source is not yet activated or it detects tandem connection information of another tandem connection or it receives correct tandem connection information from the intended tandem connection source 3. The temporary tandem connection monitor stays active until correct tandem information from SO in network element 2 is received. As soon as correct tandem information is received, M2 is removed and a tandem connection sink SK is created.

The automatic sink activation is then complete and tandem connection monitoring is working.

Tandem connection source and sink functions and how to carry these out as well as the tandem connection information exchanged over a tandem connection are known per se by those skilled in the art and are defined for example in ITU-T G.707, G.709, and G.783.

Figure 6:
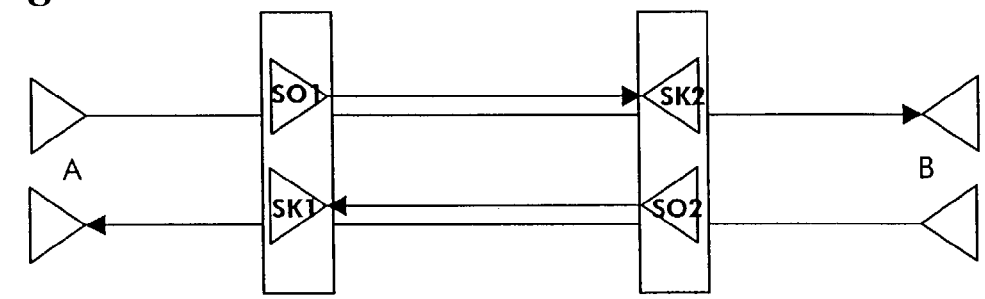
FIG. 6 shows operation of a bidirectional tandem connection.

FIG. 6 shows a bidirectional tandem connection on the signal path between path terminating network elements A and B. Network elements 2 and 6 terminate a tandem connection (other intermediate network elements are not shown in this figure). It is now assumed that this tandem connection is to be deactivated. Respective sink and source tandem connection points are denoted with SO1, SK1, SO2, and SK2.

The network management system (or the local operators) sends to each of both networking elements a request to deactivate the tandem connection (SO1,SO2,SK1,SK2). The requests in both network elements are processed asynchronously. For the purpose of the below description it is assumed that the left network element processes the request first.

Figure 7:
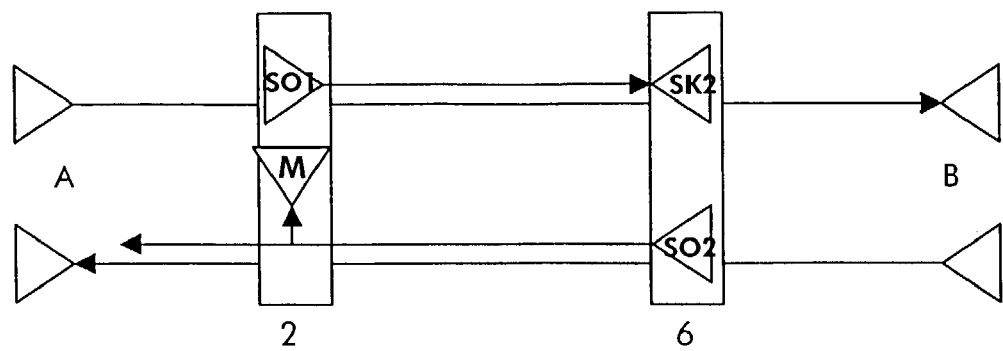
FIG. 7 shows sending of a sink inactive indication.

Network element 2 can remove the sink tandem connection termination function SK1 without any risk to disrupt the path. Network element 2 then activates a tandem connection monitor M. This is shown in FIG. 7.

Figure 8:
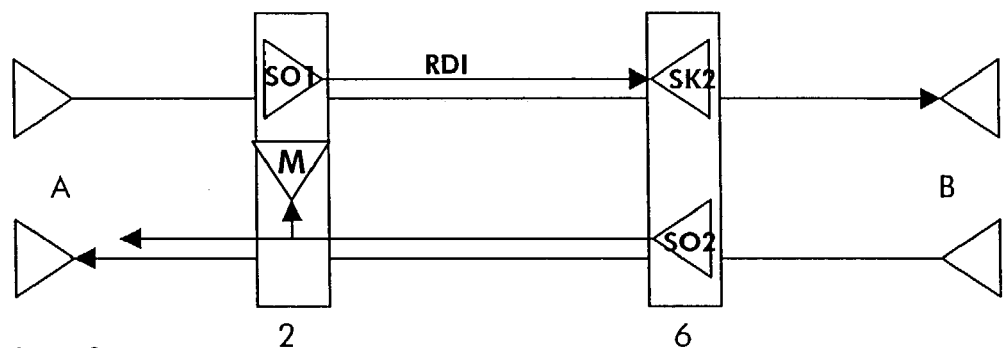
FIG. 8 shows deactivation of the second tandem connection monitor.

Then the network element configures SO1 to send the indication 'sink inactive' RDI to network element 6 at the far end of the tandem connection. SK2 detects the indication. This is shown in FIG. 8 but may not necessarily lead to any configuration changes because SK2 is still configured as full operational.

Figure 9:
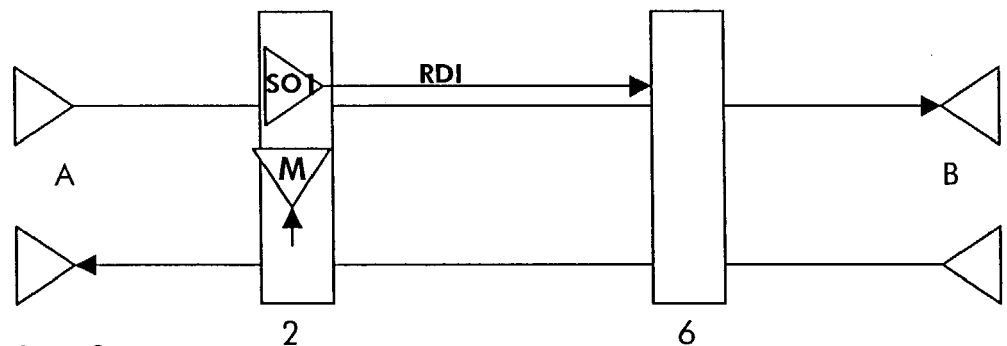
FIG. 9 shows deactivation of the first tandem connection monitor.

Now, responsive to receiving the deactivation request from network management or operator, network element 2 also processes the deactivation request. This is shown in FIG. 9. However, before deactivating SK2, according to the present invention, a 'sink inactive' indication shall be received as evidence that SK1 is not active anymore. Responsive to receiving the 'sink inactive' indication from network element 2, network element 6 removes SO2 and SK2 functions. This has no implications for the path as network element 2 is already informed of the deactivation and has confirmed its preparation to deactivate the tandem connection by sending 'sink inactive' indication.

Figure 10:
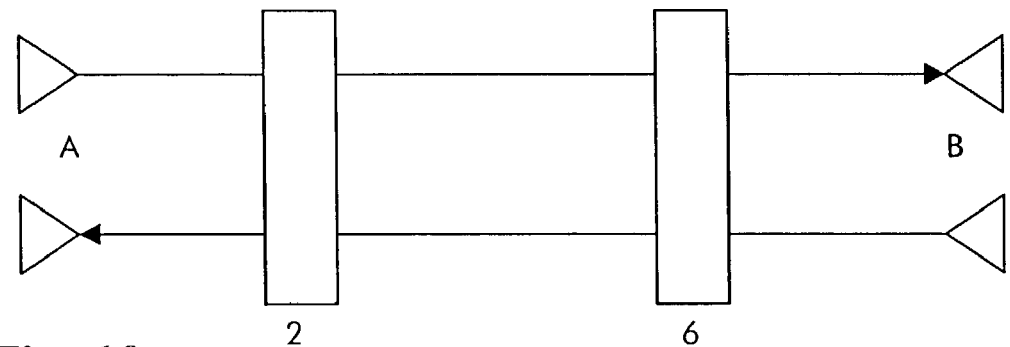
FIG. 10 shows the bi-directional signal path with tandem connection deactivated.

Monitor M at network element 2 now detects the absence of the correct tandem connection information and takes this as evidence that SK2 at network element 6 is not active anymore. As consequence network element 2 removes SO1 function. The monitor M is also removed. The automatic deactivation of the tandem connection is complete. This is shown in FIG. 10.

In SDH/SONET applications, the overhead field 'remote defective indication' (RDI) can be used for sending 'sink inactive' indication. According to the case the sink is removed. In OTN applications, the source uses a new 'Fault Indication Code', e.g., 0x03 ='Sink Inactive' or the backward defect indication or the 'TCM ACT' field.

State diagrams of the activation and deactivation process are shown in FIGS. 11 to 13. FIG. 11 shows the source activation. The tandem connection source function is inactive. On reception of an activation request, the network element activates a tandem connection monitor to monitor the tandem connection information on the path that may possibly be overwritten by activating the source function. If no tandem connection information is detected by the monitor, the network element activates the tandem connection source function.

FIG. 12 shows the corresponding state diagram for sink activation. The sink function is inactive. On reception of an activation request, the network element activates a tandem connection monitor to monitor the path for received tandem connection information. On reception of correct tandem connection information, the tandem connection sink function is activated.

FIG. 13 shows the state diagram for source and sink deactivation. Due to an existing tandem connection, source and sink functions are both activated. The network element receives now a deactivation request. Until now, the network element still receives correct tandem connection information and has not yet received a 'sink inactive' indication. This is shown by the left hand branch of the state diagram.

For processing the deactivation request, the network element now removes its sink function and replaces the latter with a tandem connection monitor. Then it send 'sink inactive' indication to the far end termination point of the existing tandem connection. If the monitor does not receive appropriate tandem connection information anymore or if the network element receives 'sink inactive' indication from the far end of the tandem connection, it deactivates its tandem connection source function.

In the right hand branch of the state diagram, the network element receives the deactivation request and also receives from the far end of the tandem connection a 'sink inactive' indication, it removes immediately its tandem connection source and sink functions.

The invention may increase the user acceptance of tandem connections in transmission networks because activation and deactivation
- simplifies processing and increases efficiency if no management system is available;
- simplifies interworking between network management and network element;
- reduces the risk to disrupt a working communication path; and
- needs less expert knowledge.

What is claimed is:

1. A method of activating a tandem connection in a transmission network responsive to receiving an activation request; said network comprising a number of physically interconnected network elements; said tandem connection being a segment of a transmission path through said network and existing for the purpose of error monitoring on said path segment, said method comprising the steps of:
    monitoring received transmission signals for an existing tandem connection before activation of said tandem connection, and
    automatically activating a tandem connection source function when no existing tandem connection was detected.

2. A method according to claim 1 further comprising the steps of monitoring received transmission signals in the far end tandem connection terminating network element for tandem connection information and automatically activating a tandem connection sink function when appropriate tandem connection information is received.

3. A method of deactivating an existing tandem connection in a transmission network responsive to receiving a deactivation request, said network comprising a number of physically interconnected network elements, said tandem connection being a segment of a transmission path through said network and existing for the purpose of error monitoring on said segment of the transmission path, said method comprising the step of:
    deactivating a tandem connection sink function and sending a sink inactive identifier to a far end tandem connection terminating network element.

4. A method according to claim 3 further comprising the step automatically deactivating a tandem connection source function in the far end tandem connection terminating network element upon reception of said sink inactive identifier.

5. A method according to claim 3 further comprising the step of monitoring the existing tandem connection and automatically deactivating a tandem connection source function when no tandem connection information is received anymore.

6. A method according to claim 3 further comprising the step of sending a remote defective indicator as signal sink inactive identifier.

7. A method according to claim 3 further comprising the step of sending a 'Fault Indication Code' or a backward defect indication as signal sink inactive identifier or sending the signal sink inactive identifier over the 'TCM ACT' channel.

8. A method according to claim 3 wherein signaling of the sink inactive identifier between tandem connection terminating network elements takes place using a reserved identifier of the path overhead of transmitted transmission signals.

9. A network element for a transmission network, said network element comprising tandem connection source and sink function means for error monitoring on a segment between two tandem connection terminating network elements along a transmission path through said network, wherein said network element further comprises means for activating or deactivating a tandem connection responsive to receiving an activation or deactivation request; said activation or deactivation means comprising a tandem connection monitor means for monitoring received transmission signals for an existing tandem connection before activation of said tandem connection, or for monitoring received transmission signals of an existing tandem connection before automatic deactivation of the tandem connection source function when no tandem connection information is detected anymore.

10. A network element according to claim 9 further comprising means for generating and sending a sink inactive identifier upon automatic deactivation of the tandem connection sink function responsive to receiving a deactivation request.

11. A network element according to claim 9 further comprising means for automatic deactivation of the tandem connection source function responsive to receiving a deactivation request and a sink inactive identifier.

* * * * *